United States Patent
Kim et al.

(10) Patent No.: US 12,542,312 B2
(45) Date of Patent: Feb. 3, 2026

(54) ECO-FRIENDLY POWER SOURCE SUCH AS A BATTERY MODULE FOR A TRANSPORTATION VEHICLE

(71) Applicant: SK On Co., Ltd., Seoul (KR)

(72) Inventors: Ho Yeon Kim, Daejeon (KR); Myeong Jin Son, Daejeon (KR); Sang Tae An, Daejeon (KR); Hwa Kyoo Yoon, Daejeon (KR); Gang U Lee, Daejeon (KR); Dong Ha Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/184,429

(22) Filed: Mar. 15, 2023

(65) Prior Publication Data
US 2024/0072330 A1 Feb. 29, 2024

(30) Foreign Application Priority Data
Aug. 30, 2022 (KR) .................. 10-2022-0109303

(51) Int. Cl.
*H01M 10/6568* (2014.01)
*H01M 10/625* (2014.01)
(Continued)

(52) U.S. Cl.
CPC ..... *H01M 10/6554* (2015.04); *H01M 10/625* (2015.04); *H01M 10/6556* (2015.04); *H01M 10/6566* (2015.04); *H01M 10/6568* (2015.04); *H01M 50/209* (2021.01); *H01M 2220/20* (2013.01)

(58) Field of Classification Search
CPC ............ H01M 50/209; H01M 50/244; H01M 50/289; H01M 50/231; H01M 10/6556; H01M 10/6554
See application file for complete search history.

(56) References Cited

U.S. PATENT DOCUMENTS

2013/0034767 A1   2/2013 Pentapati et al.
2016/0268657 A1*  9/2016 Park .................. H01M 10/6556
(Continued)

FOREIGN PATENT DOCUMENTS

CN   102916234 A   2/2013
CN   105977582 A   9/2016
(Continued)

OTHER PUBLICATIONS

Zacher et al., DE 102017119465 Machine Translation (Year: 2017).*
(Continued)

*Primary Examiner* — Ula C Ruddock
*Assistant Examiner* — Anna Korovina
(74) *Attorney, Agent, or Firm* — IP & T GROUP LLP

(57) ABSTRACT

An eco-friendly power source, such as a battery module for a transportation vehicle includes a first sub-module and a second sub-module each including a plurality of battery cells; a lower cover supporting the first sub-module and the second sub-module; a connection member coupled to the first sub-module and the second sub-module, respectively; and a cooling plate coupled to the lower cover and forming a flow path through which a refrigerant can flow, wherein at least a portion of the flow path is disposed to oppose the connection member with the lower cover interposed therebetween.

19 Claims, 11 Drawing Sheets

(51) Int. Cl.
  *H01M 10/6554*  (2014.01)
  *H01M 10/6556*  (2014.01)
  *H01M 10/6566*  (2014.01)
  *H01M 50/209*   (2021.01)

(56) References Cited

U.S. PATENT DOCUMENTS

| | | | |
|---|---|---|---|
| 2018/0159096 A1 | 6/2018 | Kim et al. | |
| 2019/0267682 A1* | 8/2019 | Seo | H01M 10/613 |
| 2019/0356028 A1* | 11/2019 | Cassard | H01M 50/229 |
| 2021/0066769 A1 | 3/2021 | Hong et al. | |
| 2021/0184303 A1 | 6/2021 | Lee et al. | |
| 2022/0209347 A1 | 6/2022 | Park et al. | |
| 2022/0258586 A1* | 8/2022 | Amsz | B62D 25/2072 |
| 2022/0348068 A1 | 11/2022 | Lee et al. | |
| 2022/0407143 A1 | 12/2022 | Park et al. | |

FOREIGN PATENT DOCUMENTS

| | | | | |
|---|---|---|---|---|
| CN | 107710450 A | 2/2018 | | |
| CN | 109891624 A | 6/2019 | | |
| CN | 112331952 A | 2/2021 | | |
| CN | 112993458 A | 6/2021 | | |
| CN | 114568039 A | 5/2022 | | |
| DE | 102016222550 A1 * | 5/2018 | ........ | H01M 10/6556 |
| DE | 102017119465 A1 * | 2/2019 | ........ | B60K 1/04 |
| EP | 3528337 A1 | 8/2019 | | |
| EP | 4016712 A1 | 6/2022 | | |
| EP | 4239759 A1 | 9/2023 | | |
| KR | 10-1149406 B1 | 6/2012 | | |
| KR | 10-2017-0085675 A | 7/2017 | | |
| KR | 10-2019-0133434 A | 12/2019 | | |
| KR | 10-2199562 B1 | 1/2021 | | |
| KR | 10-2269290 81 | 6/2021 | | |
| KR | 10-2021-0133788 A | 11/2021 | | |
| KR | 10-2022-0041428 A | 4/2022 | | |
| KR | 10-2022-0069701 A | 5/2022 | | |
| KR | 10-2022-0097332 A | 7/2022 | | |

OTHER PUBLICATIONS

Mertens et al., DE-102016222550 Machine Translation (Year: 2018).*
Mertens et al. DE-102016222550 Machine Translation (Year: 2020).*
Extended European Search Report for the European Patent Application No. 23163369.4 issued by the European Patent Office on Mar. 12, 2024.
Office Action for the Chinese Patent Application No. 202310681142.8 issued by the Chinese Patent Office on Apr. 27, 2024.
Office Action for the Korean Patent Application No. 10-2022-0109303 issued by the Korean Intellectual Property Office on Jul. 5, 2023.
Office Action for Chinese Patent Application No. 202310681142.8 issued by the Chinese Patent Office on Jan. 6, 2025.
Office Action for Korean Patent Application No. 10-2024-0026816 issued by the Korean Patent Office on Oct. 22, 2025.
Request for Accelerated Examination for Korean Patent Application No. 10-2022-0109303 filed with the Korean Patent Office on Jun. 20, 2023.

* cited by examiner

ECO-FRIENDLY POWER SOURCE SUCH AS A BATTERY MODULE FOR A TRANSPORTATION VEHICLE

CROSS-REFERENCE TO RELATED APPLICATION(S)

This application claims benefit of priority to Korean Patent Application No. 10-2022-0109303 filed on Aug. 30, 2022 in the Korean Intellectual Property Office, the disclosure of which is incorporated herein by reference in its entirety.

BACKGROUND

1. Field

Example embodiments of the present disclosure relate to a battery module.

2. Description of Related Art

A battery module including submodules with battery cells has been developed and applied as an eco-friendly power source for an electric automobile such as a hybrid vehicle. A secondary battery may be charged and discharged differently from primary batteries, and has attracted attention as a power source of various mobile devices and electric vehicles. For example, a battery module may be formed by connecting a plurality of secondary batteries using a high energy density non-aqueous electrolyte, and the battery module may be used as a power source for an electric vehicle.

When a temperature of a secondary battery is higher than an appropriate temperature, performance of the secondary battery may deteriorate, and in severe cases, there may be a risk of explosion or ignition. In particular, to configure a high capacity and large-area battery module, the number of required battery cells may increase, but as a plurality of battery cells are concentrated in a small space, temperature of the battery module may increase rapidly.

Therefore, to stably charge and discharge a high-capacity battery module including a plurality of battery cells, a cooling structure for efficiently controlling a temperature of the battery module may be necessary.

SUMMARY

An example embodiment of the present disclosure is to provide a cooling plate for swiftly and effectively cooling a battery module having high capacity and a battery module including the same.

An example embodiment of the present disclosure is to provide a cooling plate having a structure corresponding to a structure in which a plurality of sub-modules are coupled, and a battery module including the same.

According to an example embodiment of the present disclosure, an eco-friendly power source, such as a battery module for a transportation vehicle, includes a first sub-module and a second sub-module each including a plurality of battery cells; a lower cover supporting the first sub-module and the second sub-module; a connection member coupled to the first sub-module and the second sub-module, respectively; and a cooling plate coupled to the lower cover and forming a flow path through which a refrigerant can flow, wherein at least a portion of the flow path is disposed to oppose the connection member with the lower cover interposed therebetween.

The flow path may include a first flow path disposed below the first sub-module; a second flow path disposed below the second sub-module; and a third flow path connecting the first flow path to the second flow path, wherein at least a portion of the third flow path is disposed to oppose the connection member with the lower cover interposed therebetween.

The cooling plate includes a guide disposed in the flow path and configured to guide a flow of the refrigerant.

The guide may include a plurality of guide protrusions protruding in a direction toward the lower cover and in contact with the lower cover.

The first sub-module and the second sub-module may be disposed to oppose each other in a first direction, and at least one of the plurality of guide protrusions includes a flat portion inclined with respect to the first direction; and curved portions disposed on both ends of the flat portion.

The first sub-module and the second sub-module may be disposed to oppose each other in a first direction, and the guide may include one or more guide protrusion groups consisting of a plurality of guide protrusions arranged in a second direction different from the first direction.

The one or more guide protrusion groups may include a first guide protrusion group and a second guide protrusion group, the plurality of guide protrusions included in the first guide protrusion group may be spaced apart from each other by a first distance, one of the plurality of guide protrusions included in the first guide protrusion group is spaced apart from the second guide protrusion group with a second distance therebetween, and the first distance may be less than or equal to the second distance.

The first flow path may communicate with the second flow path through the third flow path.

The connection member may be coupled to one surface of the lower cover, and the cooling plate may be coupled to the other surface opposite to the one surface of the lower cover.

The lower cover may include a fastening portion fastened to the connection member, and the cooling plate may include an avoidance portion preventing contact between the fastening portion and the refrigerant.

The avoidance portion may have an opening shape penetrating through the cooling plate between a first flow path disposed below the first sub-module and a second flow path disposed below the second sub-module.

The flow path may include a first flow path forming a first path through which the refrigerant can flow; and a second flow path forming a second path partitioned from the first path, and a portion of the first flow path and a portion of the second flow path are disposed spaced apart from each other with the avoidance portion interposed therebetween.

A plurality of the avoidance portions may be disposed in a length direction of the connection member, and at least one of the first flow path and the second flow path may include a first sub-flow path and a second sub-flow path spaced apart from each other with at least one of the plurality of avoidance portions interposed therebetween.

A heat dissipation member may be disposed on the one surface of the lower cover.

According to an example embodiment of the present disclosure, a battery module includes a first sub-module and a second sub-module including a plurality of battery cells, respectively; a lower cover supporting the first sub-module and the second sub-module; a connection member disposed between the first sub-module and the second sub-module;

and a cooling plate coupled to the lower cover and forming a flow path through which a refrigerant can flow, wherein the lower cover includes a fastening portion fastened to the connection member, and the cooling plate includes an avoidance portion exposing the fastening portion.

The cooling plate may include a plurality of avoidance portions, the first sub-module and the second sub-module may be disposed to oppose each other in a first direction with the connection member interposed therebetween, and the plurality of avoidance portions may be spaced apart from each other in a second direction perpendicular to the first direction.

The cooling plate may include a flow path forming a flow path through which a refrigerant can flow, and at least a portion of the flow path may be disposed between the plurality of avoidance portions.

The flow path may include a first flow path for cooling the first sub-module; a second flow path for cooling the second sub-module; and a third flow path connecting the first flow path to the second flow path, and at least a portion of the third flow path is disposed between the plurality of avoidance portions.

The battery module may further include a fastening member penetrating through the fastening portion and fastened to the connection member.

According to another aspect of the present disclosure, a battery module includes a first sub-module including a first plurality of battery cells; a second sub-module including a second plurality of battery cells, a connection member having a first side coupled to the first sub-module and a second side coupled to the second sub-module, the second side being opposite to the first side; and a cooling plate configured to cool the first and second sub-modules.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
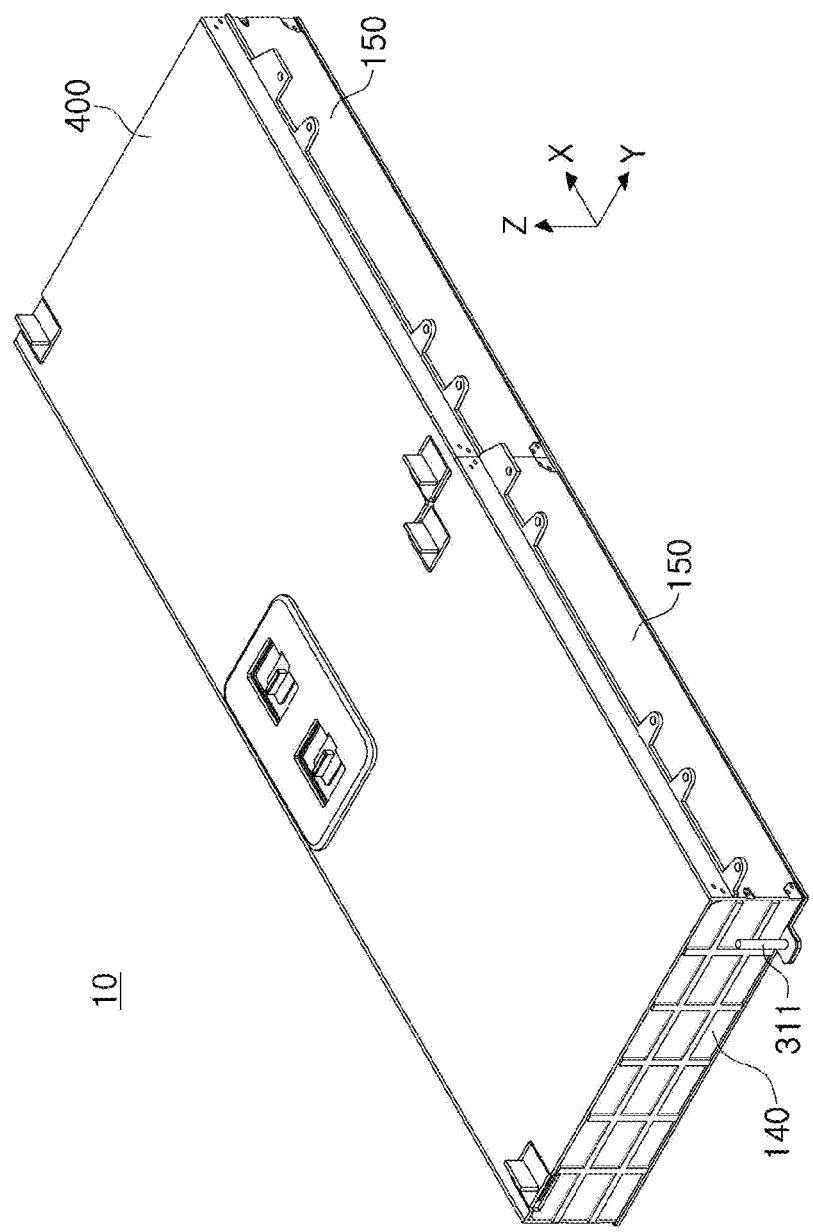
FIG. 1 is a perspective diagram illustrating a battery module according to an example embodiment of the present disclosure.

It is to be understood that the terms or words used in this description and the following claims must not be construed to have meanings which are general or may be found in a dictionary. Therefore, considering the notion that an inventor may most properly define the concepts of the terms or words to best explain his or her invention, the terms or words must be understood as having meanings or concepts that conform to the technical spirit of the present disclosure. Also, since the example embodiments set forth herein and the configurations illustrated in the drawings are nothing but a mere example and are not representative of all technical spirits of the present disclosure, it is to be understood that various equivalents and modifications may replace the example embodiments and configurations at the time of the present application.

In the drawings, same elements will be indicated by same reference numerals. Also, redundant descriptions and detailed descriptions of known functions and elements which may unnecessarily make the gist of the present disclosure obscure will not be provided. In the accompanying drawings, a portion of elements may be exaggerated, omitted or briefly illustrated, and the sizes of the elements do not necessarily reflect the actual sizes of these elements.

The terms, "include," "comprise," "is configured to," etc. of the description are used to indicate the presence of features, numbers, steps, operations, elements, portions or combination thereof, and do not exclude the possibilities of combination or addition of one or more features, numbers, steps, operations, elements, portions or combination thereof.

In example embodiments, terms such as an upper side, an upper portion, a lower side, a lower portion, a side surface, a front surface, a rear surface, or the like, are represented based on the directions in the drawings, and may be used differently if the direction of an element is changed.

The terms "first," "second," and the like may be used to distinguish one element from the other, and may not limit a sequence and/or an importance, or others, in relation to the elements. In a portion of cases, a first element may be referred to as a second element, and similarly, a second element may be referred to as a first element without departing from the scope of the invention in the example embodiments.

Figure 2:
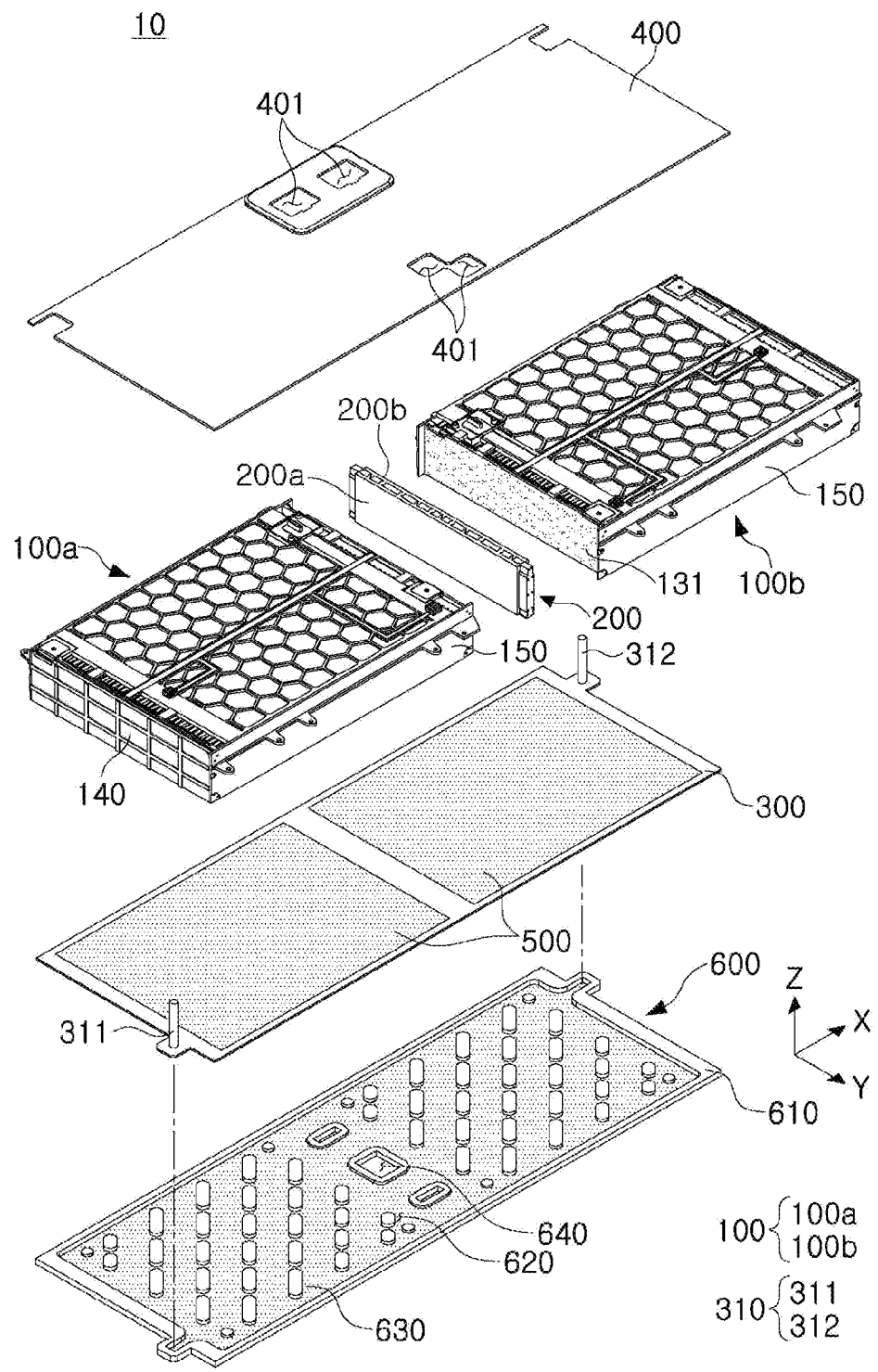
FIG. 2 is an exploded perspective diagram illustrating a battery module according to an example embodiment of the present disclosure.
Figure 3:
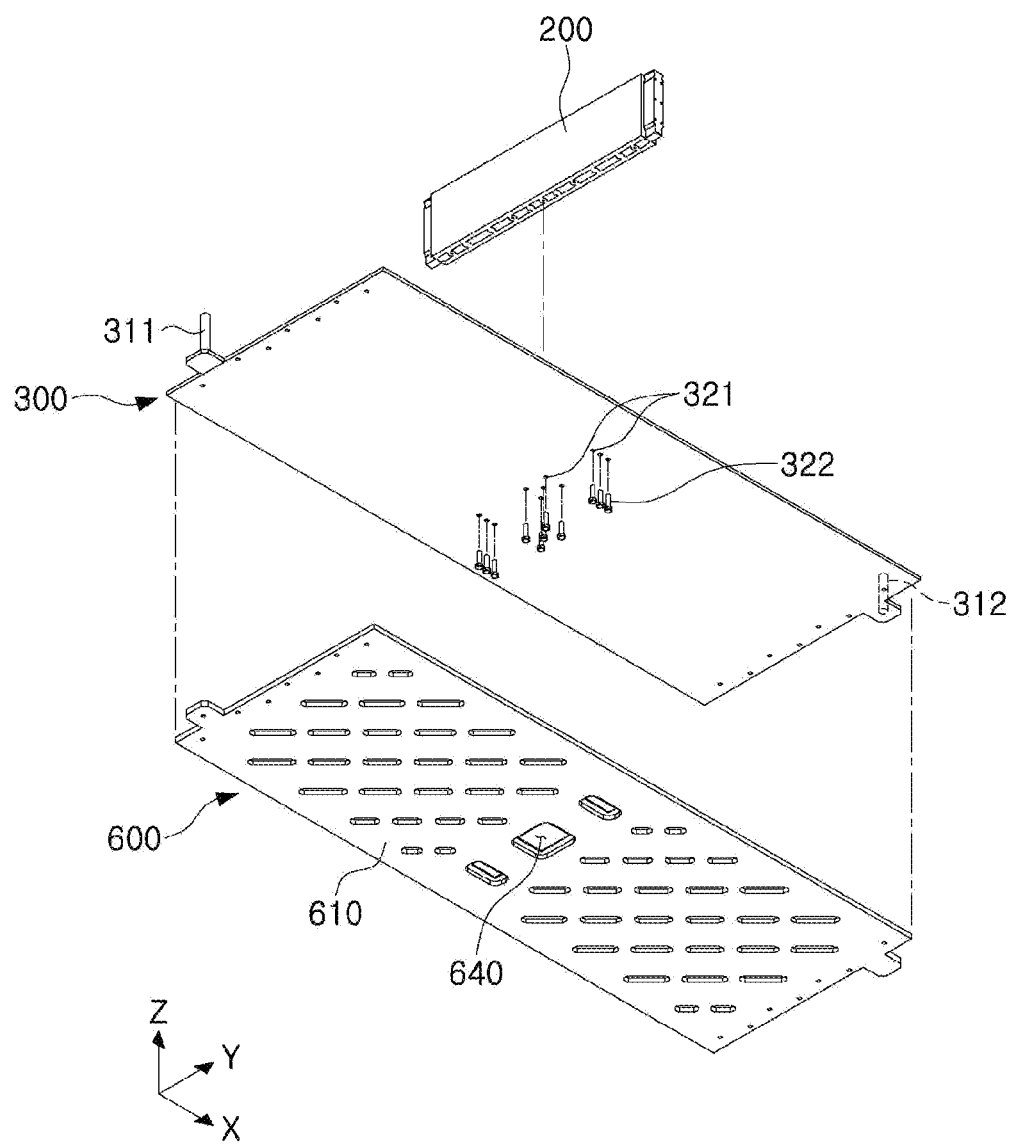
FIG. 3 is an exploded perspective diagram illustrating a battery cell assembly according to an example embodiment of the present disclosure.

FIG. 1 is a perspective diagram illustrating a battery module according to an example embodiment. FIG. 2 is an exploded perspective diagram illustrating a battery module according to an example embodiment. FIG. 3 is a diagram illustrating a state in which a cooling plate is coupled to a lower cover.

Referring to FIG. 2, the battery module 10 may include a plurality of sub-modules 100, a connection member 200 disposed between the sub-modules 100, a lower cover 300 and an upper cover 400. The lower cover 300 and the upper cover 400 may support the sub-modules 100. The battery module 10 may further include a cooling plate 600 for cooling the battery module 10.

In the embodiment of FIG. 2 the plurality of sub-modules 100 may, for example, include a first sub-module 100*a* and a second sub-module 100*b* arranged adjacent to each other in a first direction, e.g., an X-axis direction, with the connection member 200 disposed between them. The first sub-module 100a and the second sub-module 100b may be assembled together and may form at least a portion of one battery module 10.

One or more connection members 200 may be disposed between two of the plurality of sub-modules 100. For example, as illustrated in FIG. 2, a connection member 200 may be disposed between the first sub-module 100a and the second sub-module 100b disposed side by side in the first direction (X-axis direction).

The connection member 200 may have a shape of a partitioner extending in a second direction (Y-axis direction) perpendicular to the first direction (X-axis direction). The connection member 200 may be formed of a material having a predetermined level of rigidity so as to structurally support the first sub-module 100a and the second sub-module 100b. For example, the connection member 200 may include a metal material such as aluminum or stainless steel.

The first sub-module 100a and the second sub-module 100b may be coupled to opposite sides of the connection member 200, respectively. For example, the first sub-module 100a may be fastened to at least one portion of a first side of the connection member 200, and the second sub-module 100b may be fastened to at least one portion of a second side of the connection member 200. The second side of the connection member 200 may be opposite to the first side of the connection member 200. Accordingly, the first sub-module 100a and the second sub-module 100b may be fixed to each other via the connection member 200.

In the battery module 10 including a plurality of sub-modules 100, the connection member 200 may work as a reference point for assembling the sub-modules 100. That is, the connection member 200 may partition a space in the battery module 10 in which each sub module 100 is accommodated, and may guide a position in which the sub module 100 is disposed.

The battery module 10 may include lower cover 300 and upper cover 400 for supporting the plurality of sub-modules 100. For example, referring to FIG. 2, the integrally formed lower cover 300 may be disposed to cover the lower surfaces of the plurality of sub-modules 100, and the integrally formed upper cover 400 may be disposed to cover the upper surfaces of the plurality of sub-modules 100. The lower cover 300 and the upper cover 400 may be integrally formed to stably support the plurality of sub-modules 100.

The battery module 10 may include a cooling plate 600 for cooling the battery modules. For example, referring to FIG. 2, the cooling plate 600 may be coupled to the lower cover 300 and may absorb thermal energy generated by the sub-modules 100a and 100b.

The cooling plate 600 may include a cooling frame 610 forming a flow path 620. The cooling frame 610 may form a structure of the cooling plate 600 and may be combined with the lower cover 300 and may form a flow path 620 which may be a path through which a refrigerant can flow. Any suitable coupling method may be used between the cooling frame 610 and the lower cover 300, such as, for example, welding, brazing, roll-bonding, thermal fusion, filler bonding, friction welding, or a physical fastening method through a separate fastening member. These methods may be applied alone or in combination with each other.

The flow path 620 may be formed on one surface of the cooling frame 610. For example, referring to FIG. 2, the cooling frame 610 may have a structure in which at least a portion thereof is recessed in a downward direction (e.g., in a negative Z-axis direction), and as the cooling frame 610 is coupled to the lower cover 300, a flow path 620 through which refrigerant can flow may be formed in the space defined between the recessed portion of the cooling frame 610 and the lower cover 300. However, FIG. 2 only illustrates an example shape of the flow path 620, and the flow path 620 may be formed in the cooling frame 610.

In FIG. 2, a portion of the cooling plate 600 may be shaded, which is only for distinguishing a portion in which the refrigerant may flow and a portion in which the refrigerant does not flow in the flow path 620. The shading does not indicate that the shaded portion and the non-shaded portion are separate members. For example, the cooling plate 600 in FIG. 2 may have an integrated cooling frame 610 and a flow path 620 formed on at least a portion of the cooling frame 610. The shading is applied in FIGS. 5 to 11 for the same reasons as indicated above for FIG. 2.

Referring to FIG. 2, the refrigerant flowing through the flow path 620 may be any suitable cooling fluid. The refrigerant flowing through the flow path 620 may be, for example, cooling water. The refrigerant flowing into the cooling plate 600 may absorb thermal energy generated in the first and second sub-modules 100a and 100b for cooling the first and second sub-modules 100a and 100b.

The cooling plate 600 may include a guide 630 for guiding the flow of the refrigerant. For example, referring to FIG. 2, the guide 630 may be formed such that a portion of the cooling frame 610 may protrude in a direction toward the lower cover 300 in the flow path 620. When the cooling frame 610 is coupled to the lower cover 300, the guide 630 may be in contact with the lower cover 300. Accordingly, the refrigerant may not pass through the guide 630 and may flow along the circumference of the guide 630. Accordingly, the flow path or flow rate of the refrigerant may be determined by appropriately designing the shape of the guide 630.

In the cooling plate 600 according to the example embodiments, the shape of the guide 630 may be configured in various manners. For example, as illustrated in FIG. 2, at least a portion of the guide 630 may have a shape of a protrusion extending in a direction oblique with respect to the first direction (X-axis direction) in which the first sub-module 100a and the second sub-module 100b oppose each other. However, the shape of the guide 630 is not limited to the example illustrated in the drawings.

Depending on the shape of the guide 630, the flow rate, cooling efficiency, and pressure drop of the refrigerant flowing through the flow path 620 may vary. The guide 630 may, for example, have a shape that optimizes the flow of the cooling fluid for enhance heat removal. A specific shape of the guide 630 will be described later.

Referring to FIGS. 2 and 3, the cooling frame 610 or the lower cover 300 may include a plurality of ports 310 through which refrigerant flows in and out. For example, the lower cover 300 may include a first port 311 and a second port 312 communicating with the flow path 620 of the cooling plate 600. Here, the first port 311 may be an inlet for the refrigerant, and the second port 312 may be an outlet through which the refrigerant may be discharged. That is, the refrigerant may flow into the first port 311, may flow along the flow path 620 formed by the cooling frame 610, and may be discharged to the outside of the battery module 10 through the second port 312.

The positioning of the first port 311 and the second port 312 may vary. FIG. 2 illustrates a configuration according to which the first and second ports 311 and 312 are disposed on opposite ends of the lower cover 300. Alternatively, the first port 311 and the second port 312 may be disposed in the cooling frame 610.

In the battery module, a plurality of ports 310 may be disposed. For example, as illustrated in FIG. 2, the battery module 10 may include a single first port 311 and a single second port 312, and in this case, the refrigerant flowing into the first port 311 may cool both the first sub-module 100a and the second sub-module 100b.

Alternatively, a plurality of first ports 311 and a plurality of second ports 312 may be disposed such that independent cooling flow paths may be formed for each of the sub-modules 100a and 100b.

In the battery module 10 according to the example embodiments, both the connection member 200 and the cooling plate 600 may be coupled to the lower cover 300. For example, the connection member 200 may be coupled to one surface of the lower cover 300 and the cooling plate 600 may be coupled to the other surface of the lower cover 300.

The cooling plate 600 may include one or more avoidance portions 640 not to interfere with the coupling structure of the connection member 200 and the lower cover 300. Referring to FIGS. 2 and 3, the avoidance portion 640 may be an opening penetrating through the cooling frame 610.

One or more avoidance portions 640 may be provided to correspond to positions in which the connection member 200 and the lower cover 300 are coupled to each other. For example, referring to FIG. 3, the lower cover 300 may include a fastening portion 321 coupled to the connection member 200, and the fastening portion 321 may be exposed in a downward direction (e.g., a negative Z-axis direction) of the battery module 10 through the avoidance portion 640.

The battery module 10 may include a fastening member 322 for coupling the lower cover 300 to the connection member 200. The fastening portion 321 of the lower cover 300 may have a hole shape into which the fastening member 322 may be inserted. The fastening member 322 may pass through the fastening portion 321 of the lower cover 300 and may be fastened to the connection member 200, and the plurality of fastening members 322 may be connected to the cooling frame 610 corresponding to the position to which the avoidance portion 640 is fastened.

The avoidance portion 640 may be disposed to oppose the connection member 200 with the lower cover 300 therebetween. The fastening portion 321 of the lower cover 300 may be exposed through the avoidance portion 640, and the fastening member 322 may be inserted into the exposed fastening portion 321 and may be coupled to the connection member 200.

At least a portion of the flow path 620 may be formed between the plurality of avoidance portions 640. That is, a cooling flow path may be formed between the avoidance portions 640, and accordingly, at least a portion of the refrigerant flowing into the cooling plate 600 may flow between the plurality of avoidance portions 640.

In the cooling plate 600, the flow path 620 may be configured to cover the entirety of the plurality of sub-modules 100. For example, referring to FIG. 2, the flow path 620 of the cooling plate 600 may have a cooling region opposing the lower surface of the first sub-module 100a and the lower surface of the second sub-module 100b to cool both the first sub-module 100a and the second sub-module 100b. That is, the cooling plate 600 of the battery module 10 may be configured to have an integrated cooling structure for cooling the entirety of the plurality of sub-modules 100.

To improve cooling efficiency, a heat dissipation member 500 may be disposed between the lower cover 300 and the plurality of sub-modules 100. One surface of the heat dissipation member 500 may be disposed to be in contact with the sub-module 100 and the other surface opposite to the one surface may be in contact with the lower cover 300. The heat dissipation member 500 may be provided with a thermal adhesive. The heat dissipation member 500 may fill a space between the sub module 100 and the lower cover 300 such that heat transfer by conduction may be actively performed. Accordingly, heat dissipation efficiency of the battery module 10 may be increased.

The battery module 10 may include an upper cover 400 covering the upper portion of the sub-module 100. The upper cover 400 may be integrally formed to simultaneously support the plurality of sub-modules 100.

The upper cover 400 may have an opening 401 to expose a terminal portion of the sub-module 100 (e.g., 122 in FIG. 4) or a portion of the sensing module of the sub-module 100.

Each sub-module 100 may include a plurality of battery cells and may be configured to store or discharge electrical energy.

In the battery module 10, a plurality of sub-modules 100 may be electrically connected to each other and may output design power values required for the battery module. For example, the two sub-modules 100 opposing each other with the connection member 200 interposed therebetween may be connected to each other in series or in parallel through terminal portions (e.g., 122 in FIG. 4).

Conversely, in the battery module 10, the plurality of sub-modules 100 may be electrically isolated from each other. For example, the two sub-modules 100 opposing each other with the connection member 200 interposed therebetween may be electrically separated from each other, and the terminal portion of each sub-module 100 (e.g., 122 in FIG. 4) may be configured to be electrically connected to another neighboring battery module 10.

Hereinafter, sub-modules according to example embodiments will be described with reference to FIG. 4.

Figure 4:
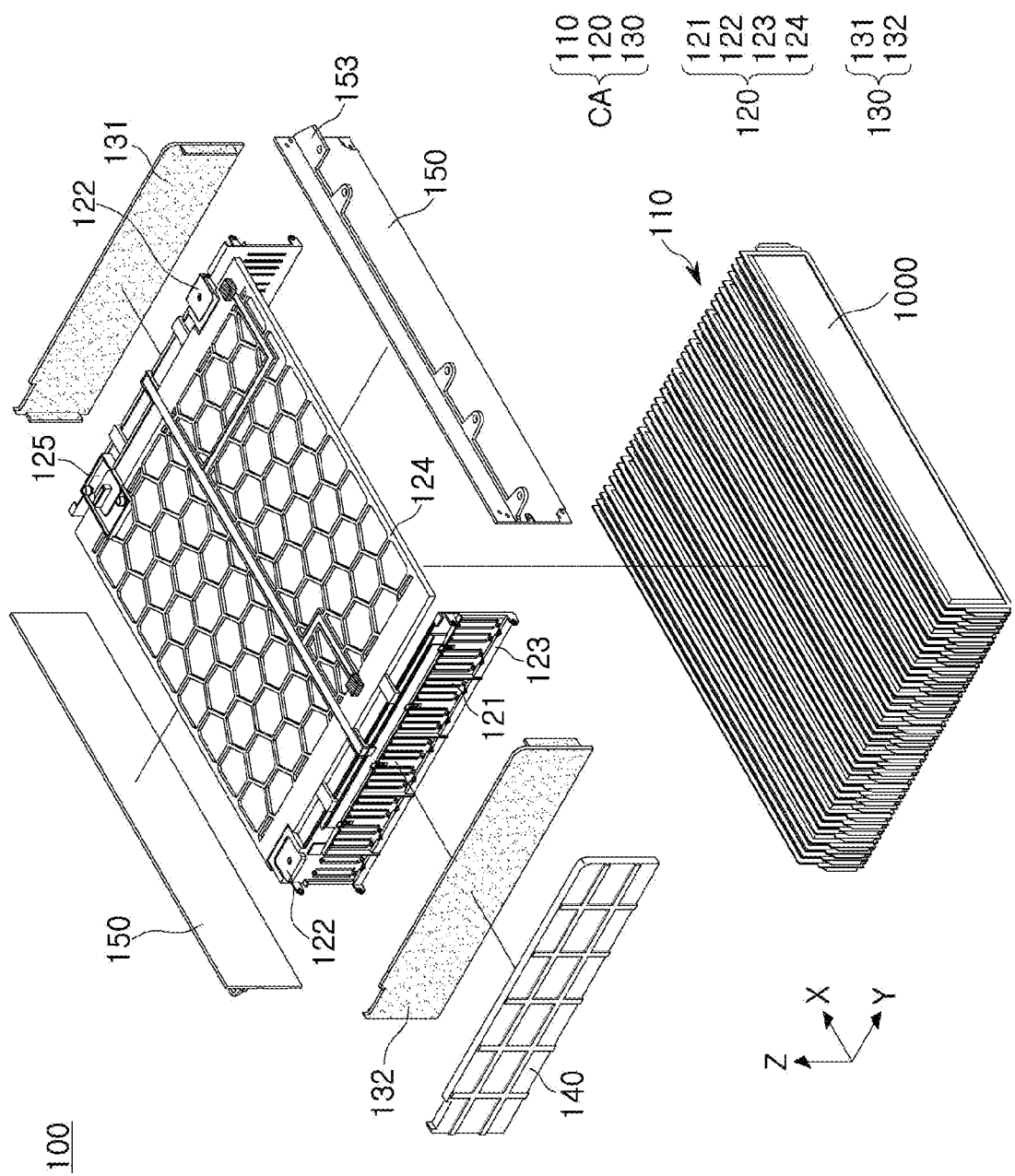
FIG. 4 is an exploded perspective diagram illustrating a sub-module included in a battery module according to an example embodiment of the present disclosure.

FIG. 4 is an exploded perspective diagram illustrating a sub-module 100 included in a battery module 10 according to an example embodiment. Since the sub-module 100 described with reference to FIG. 4 may correspond to one of the first sub-module 100a and the second sub-module 100b previously described with reference to FIGS. 1 to 3, overlapping descriptions may be omitted.

The battery module 10 may include a plurality of sub-modules 100. At least one of the plurality of sub-modules 100 included in the battery module 10 may include a cell assembly CA and a plurality of protective covers 140 and 150 protecting the cell assembly CA. Here, the protective covers 140 and 150 may include an end cover 140 covering at least one side of the cell assembly CA and one or more side covers 150.

The cell assembly CA may include a cell stack 110 including battery cells 1000 stacked in one direction (e.g., the Y-axis direction in FIG. 4), a busbar assembly 120 electrically connected to the cell stack 110, and an insulating cover 130 coupled to the busbar assembly 120.

The cell stack 110 may include a plurality of battery cells 1000 electrically connected to each other. In one cell stack 110, the plurality of battery cells 1000 may be stacked in one direction (e.g., the Y-axis direction). In the description below, the stacking direction of the battery cells 1000 included in the cell stack 110 may be referred to as a "second direction" or a "cell stacking direction."

The busbar assembly 120 may include a plurality of busbars 121 electrically connecting the battery cells 1000 of the cell stack 110 to each other and a support frame supporting the busbars 121.

The busbar 121 may be formed of a conductive material and may electrically connect the plurality of battery cells 1000 to each other. The busbar 121 may be electrically connected to the battery cell 1000 while being fixed to the support frame.

The support frame may support the busbar 121 to be stably connected to the battery cell 1000. The support frame may include a non-conductive material (e.g., plastic) having a predetermined stiffness and may structurally support the plurality of busbars 121.

The support frame may oppose at least one side of the cell stack 110. For example, referring to FIG. 4, the support frame may include a busbar frame 123 opposing the cell stack 110 in a first direction (X-axis direction) and supporting the busbar 121, and a connection frame 124 opposing the cell stack 110 in the third direction (Z-axis direction) and connected to the busbar frame 123. Here, the second direction may be perpendicular to the first direction, and the third direction may be perpendicular to both the first and second directions.

A sensing module 125 for sensing the electrical and thermal states of the battery cells 1000 may be disposed on the connection frame 124. Voltage information or temperature information sensed by the sensing module 125 may be transmitted to the outside of the sub-module 100 and may be used to control the battery module 10.

The cell assembly CA may include the insulating cover 130 covering at least one surface of the busbar assembly 120.

The insulating cover 130 may include a non-conductive material and may prevent the busbar 121 of the busbar assembly 120 from being unintentionally shorted with other components.

An end cover 140 may be disposed on the outermost side of one side of the sub module 100. The end cover 140 may include a rigid material (e.g., a metal material such as aluminum) and may protect the cell assembly CA from external impact. In a state in which the sub-module 100 is coupled to the connection member (e.g., 200 in FIG. 2) and the lower cover (e.g., 300 in FIG. 2), the end cover 140 may be spaced apart from the connection member 200 and may be disposed on one of the edges of the lower cover 300.

In example embodiments, a plurality of insulating covers 130 of the cell assembly CA may be provided. For example, the sub module 100 may include a first insulating cover 131 electrically separating the connecting member 200 and the busbar assembly 120 from each other, and a second insulating cover 132 electrically separating the end cover 140 and the busbar assembly 120 from each other.

The first insulating cover 131 may be disposed between the connection member 200 and the busbar 121 and may electrically separate the components from each other. Similarly, the second insulating cover 132 may be disposed between the end cover 140 and the busbar 121 and may electrically separate the components from each other.

The insulating cover 130 may be coupled to the busbar assembly 120. For example, each of the first insulating cover 131 and the second insulating cover 132 may be inserted into and fixed to the busbar frame 123. Alternatively, the insulating cover 130 may be fixed to the busbar frame 123 through a fastening member.

The sub module 100 may include a side cover 150 opposing at least one side of the cell stack 110.

A pair of side covers 150 may be provided to cover different surfaces of the cell stack 110. The pair of side covers 150 may be coupled to the end cover 140 and the connection member 200, may form a side surface of the sub module 100 and may protect the cell stack 110 from an external environment.

The side cover 150 may oppose the cell stack 110 in a different direction from the end cover 140. For example, as illustrated in FIG. 4, the side cover 150 may be disposed to oppose the cell stack 110 in the second direction (Y-axis direction), and the end cover 140 may be disposed to oppose the cell stack 110 in the first direction (X-axis direction) with the busbar assembly 120 and the second insulating cover 132 interposed therebetween. Accordingly, the end cover 140, the pair of side covers 150, and the first insulating cover 131 may form four surfaces of the sub module 100.

In the side cover 150, the end cover 140 may be coupled to one end, and the connection member 200 of the battery module 10 may be coupled to the other end opposite to one side. To increase coupling strength, the busbar assembly 120 may also be coupled to the side cover 150.

The side cover 150 may further include a connection portion 153 which may be structurally connected to an external component of the battery module 10. For example, referring to FIG. 4, the connection portion 153 may have a structure protruding from the surface of the side cover 150 in a second direction (Y-axis direction). The battery module 10 may be coupled to an external component (e.g., a battery pack housing in which the plurality of battery modules 10 are accommodated) through the connection portion 153 of the side cover 150.

The lower surface of the sub-module 100 may be configured such that the cell stack 110 may be exposed. For example, the sub-module 100 may not have a cover member on a lower surface thereof, and accordingly, the cell stack 110 may be in direct contact with an external component of the sub-module 100 (e.g., the lower cover 300 or the heat dissipation member 500 of the battery module 10 illustrated in FIG. 2). Accordingly, heat may be smoothly discharged from the cell stack 110 toward the lower portion of the sub-module 100, such that heat dissipation efficiency of the sub-module 100 may be increased.

In the sub-module 100, an end cover 140 may be disposed in an outermost portion of one side and a first insulating cover 131 may be disposed in an outermost portion of the other side. That is, one sub-module 100 may include a first surface on which the insulating cover 131 is disposed and a second surface on which the end cover 140 is disposed. For example, referring to FIG. 4, the first surface of one sub-module 100 may be closed with an insulating cover 131, and the second surface opposite to the first surface may be closed with an end cover 140.

The two sub-modules 100 disposed to oppose each other with the connection member 200 interposed therebetween may be disposed such that the first surfaces thereof may oppose the connection member 200. For example, the first sub-module 100a may be coupled to the connection member 200 such that the first surface on which the insulating cover 130 is disposed may oppose the connection member 200, and the second sub-module 100b may be coupled to the connection member 200 such that the first surface on which the insulating cover 130 is disposed may oppose the connection member 200. By the connection structure, in the battery module 10 in which the first sub-module 100a and the second sub-module 100b are connected to each other, the end covers 140 of each sub-module 100 may form the front and rear outer surfaces, and the side covers 150 coupled to the end cover 140 may form the side outer surfaces.

Hereinafter, the flow path formed by the cooling plate will be described with reference to FIGS. 5 to 7.

Figure 5:
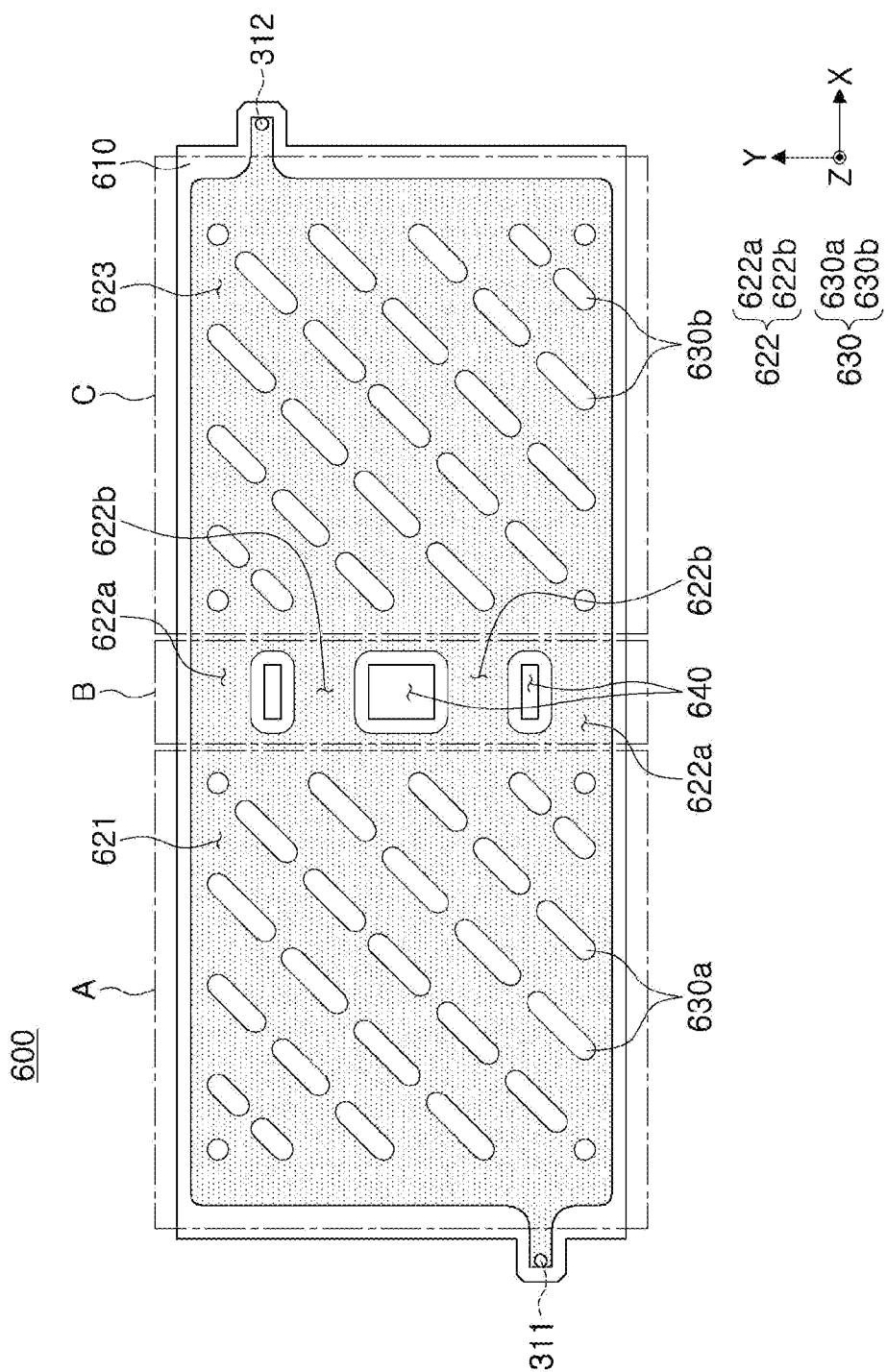
FIG. 5 is a diagram illustrating a cooling plate according to an example embodiment of the present disclosure, viewed from above.

FIG. 5 is a diagram illustrating cooling plate 600 according to an example embodiment, viewed from above. FIG. 6 is an enlarged diagram illustrating a portion of the cooling plate 600 in FIG. 5 according to an example embodiment. FIG. 7 is a diagram illustrating an example in which a shape of an avoidance portion 640 is partially changed in the cooling plate 600 in FIG. 5. Since the cooling plate 600 described with reference to FIGS. 5 and 6 may be similar to the cooling plate 600 previously described with reference to FIGS. 1 to 3, overlapping descriptions may not be provided.

The cooling plate 600 may be configured to cool the entirety of the plurality of sub-modules (e.g., 100 in FIG. 2) included in the battery module (e.g., 10 in FIGS. 1 and 2). For example, the cooling plate 600 may cool first and second regions A and C corresponding to the first sub-module 100a and the second sub-module 100b, respectively, and a third region B corresponding to a portion in which a connecting member (e.g., 200 in FIGS. 2 and 3) is disposed.

The flow path of the cooling plate 600 may include a first flow path 621 for cooling the first region A, a second flow path 623 for cooling the second region C, and third flow path 622 for cooling the third region B. Referring to FIG. 5, the first flow path 621, the third flow path 622, and the second flow path 623 may be arranged in a direction parallel to the first direction (e.g., the X-axis direction) in which the first sub-module 100a and the second sub-module 100b are arranged.

The first flow path 621 of the cooling plate 600 may communicate with the second flow path 623 through the third flow path 622.

The refrigerant flowing from the first port 311 may cool the first sub-module 100a while flowing along the first flow path 621. The refrigerant passing through the first flow path 621 may flow to the second flow path 623 through the third flow path 622. The refrigerant may cool the second sub-module 100b while flowing along the second flow path 623 and may exit through the second port 312.

The cooling frame 610 forming the first to third flow paths 621, 622, and 623 may be integrally formed, and accordingly, the cooling plate 600 having a structurally simple and stable cooling performance may be implemented.

Guide 630 may be disposed in the first flow path 621 and the second flow path 623. The guide 630 may guide the flow of the refrigerant.

The guide 630 may include a plurality of guide protrusions 630a and 630b arranged in a predetermined pattern. Here, the pattern formed by the guide protrusions 630a and 630b may be varied depending on the cooling performance requirements of the battery module 10. For example, referring to FIGS. 5 and 6, the cooling plate 600 may include a plurality of guide protrusions 630a and 630b forming an oblique pattern with respect to a first direction (X-axis direction) such that the refrigerant which flow in may spread swiftly and widely. The refrigerant flowing in through the first port 311 may spread swiftly and evenly to the first flow path 621 by the guide protrusions 630a disposed in an oblique pattern in the first flow path 621. Accordingly, a decrease of pressure may be prevented while the refrigerant flows through the flow path and may secure high cooling performance.

Figure 6:
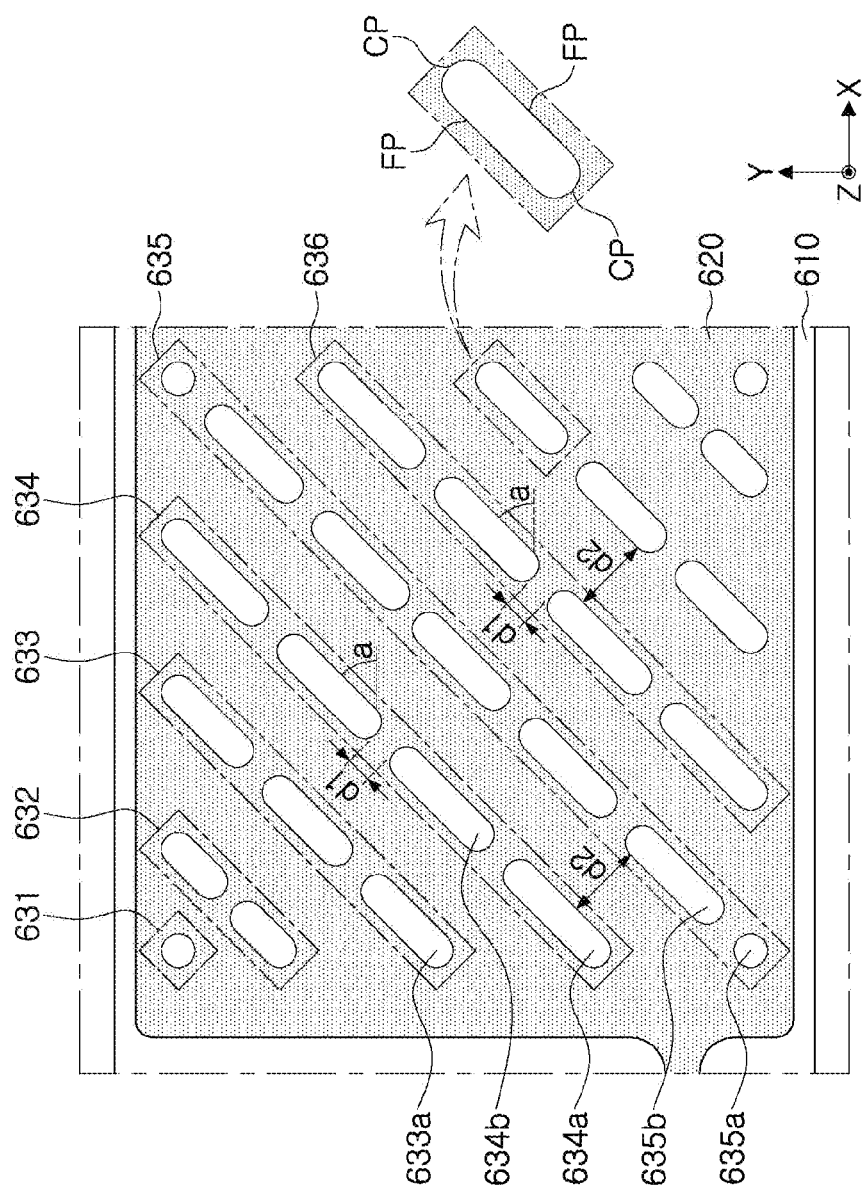
FIG. 6 is an enlarged diagram illustrating a portion of the cooling plate in FIG. 5 according to an example embodiment of the present disclosure.

Referring to FIG. 6, the structure and arrangement of the guide protrusions will be described in detail.

At least a portion of the plurality of guide protrusions may be arranged in one direction and may form a protrusion group. For example, the guide 630 may include a guide protrusion groups 631, 632, 633, and 634, a plurality of groups of a plurality of guide protrusions 634a, 634b, or the like, arranged in an oblique direction with respect to one edge of the cooling frame 610.

In the flow path 620, a plurality of guide protrusion groups 631, 632, 633, and 634 may be formed. Referring to FIG. 6, the guide 630 may include a plurality of guide protrusion groups 631, 632, 633, and 634, each having a different number of guide protrusions. For example, the first guide protrusion group 631 may include a guide protrusion, the second guide protrusion group 632 may include two guide protrusions, and the third guide protrusion group 633 may include three guide protrusions.

The guide protrusions included in one of the groups of guide protrusions may have different shapes. For example, by including the fifth guide protrusion group 635, a portion of guide protrusions 635a may have a circular shape, and the other portion of the guide protrusions 635b may have curved ends and a flat central portion.

The guide protrusions included in a group of guide protrusions may be spaced apart from each other in one direction. For example, the guide protrusions 634a, 634b, or the like, of the fourth guide protrusion group 634 may be spaced apart to have a first distance d1 therebetween, and may be disposed in the fourth direction having a predetermined angle (a) with the first direction (X-axis direction). Here, the predetermined angle may be an acute angle.

One of the guide protrusion groups may be spaced apart from another guide protrusion group with a predetermined distance therebetween. For example, referring to FIG. 6, the guide protrusion 634a included in the fourth guide protrusion group 634 and the guide protrusion 625b included in the fifth guide protrusion group 635 may be spaced apart from each other to have a second distance d2 therebetween.

In the arrangement of the guide protrusions, the first distance d1 may be equal to or smaller than the second distance d2. When the first distance d1 is smaller than the second distance d2, the refrigerant may smoothly flow in the fourth direction.

At least one of the plurality of guide protrusions may include a flat portion FP having a surface parallel to the fourth direction and a curved portion CP disposed on both ends of the flat portion FP. For example, referring to the partially enlarged diagram in FIG. 6, one of the guide protrusions may include a pair of flat portions FP having an inclination with respect to a first direction (X-axis direction) and a curved portion CP connecting the pair of flat portions FP to each other. In this case, the plurality of guide protrusions included in one of the guide protrusion groups may be arranged such that the curved portions CP may oppose each other. Due to this arrangement structure, a decrease of pressure may be prevented while the refrigerant flows between the plurality of guide protrusions, and an effect of facilitating the diffusion of the refrigerant may be obtained.

Similar to the first flow path 621, a plurality of guides 630 may be disposed in the second flow path 623 as well. The guide 630 disposed on the second flow path 623 may have a pattern similar to that of the guide 630 disposed on the first flow path 621. For example, a plurality of guide protrusions 630b forming a pattern in a direction parallel to the fourth direction described above may be formed in the second flow path 623.

Referring to FIG. 5, when it is assumed that the first region A or the second region C has a substantially rectangular flat shape, the fourth direction, which is the pattern direction of the guide, may be substantially parallel to a diagonal line connecting the lower left corner (hereinafter referred to as a first corner) and the upper right corner (hereinafter referred to as a second corner) of the first region A and the second region C. The first port 311 through which the refrigerant flows may be disposed adjacent to the first corner of the first region A. Also, the second port 312 through which the refrigerant is discharged may be disposed adjacent to the second corner of the second region C. According to this arrangement, the guide 630 may reduce the flow friction in the flow process until the refrigerant flowing into the first port 311 is discharged to the second port 312, thereby reducing the pressure of the refrigerant. Therefore, since the flow of the refrigerant may be smoothly maintained even with a small amount of energy, energy required for cooling the battery module 10 may be saved.

The third flow path 622 disposed between the first flow path 621 and the second flow path 623 may have a plurality of flow paths such that the refrigerant may smoothly flow through the first flow path 621 and the second flow path 623. Referring to FIG. 5, the cooling frame 610 may have a plurality of avoidance portions 640 avoiding a portion in which the connection member 200 and the lower cover are coupled to each other, and a flow path may be formed between the avoidance portions 640. For example, the third flow path 622 may include a side flow path 622a disposed between the avoidance portion 640 and the edge of the cooling frame 610 and a center flow path 622b disposed between the side flow path 622a and the plurality of avoidance portions 640.

As such, since the cooling plate 600 has a plurality of flow paths between the avoidance portions 640, interference with the coupling structure of the battery module 10 may be prevented and a smooth cooling flow path may be secured. Also, by forming a flow path by avoiding the portion in which the fastening member (e.g., 322 in FIG. 3), the refrigerant may be prevented from leaking through the fastening portion.

However, the specific shape of the guide 630 is not limited to the above example. For example, differently from the example illustrated in FIG. 5, the guide 630 formed in the first flow path 621 and the guide 630 formed on the second flow path 623 may include a plurality of guide protrusions arranged in different patterns.

Figure 7:
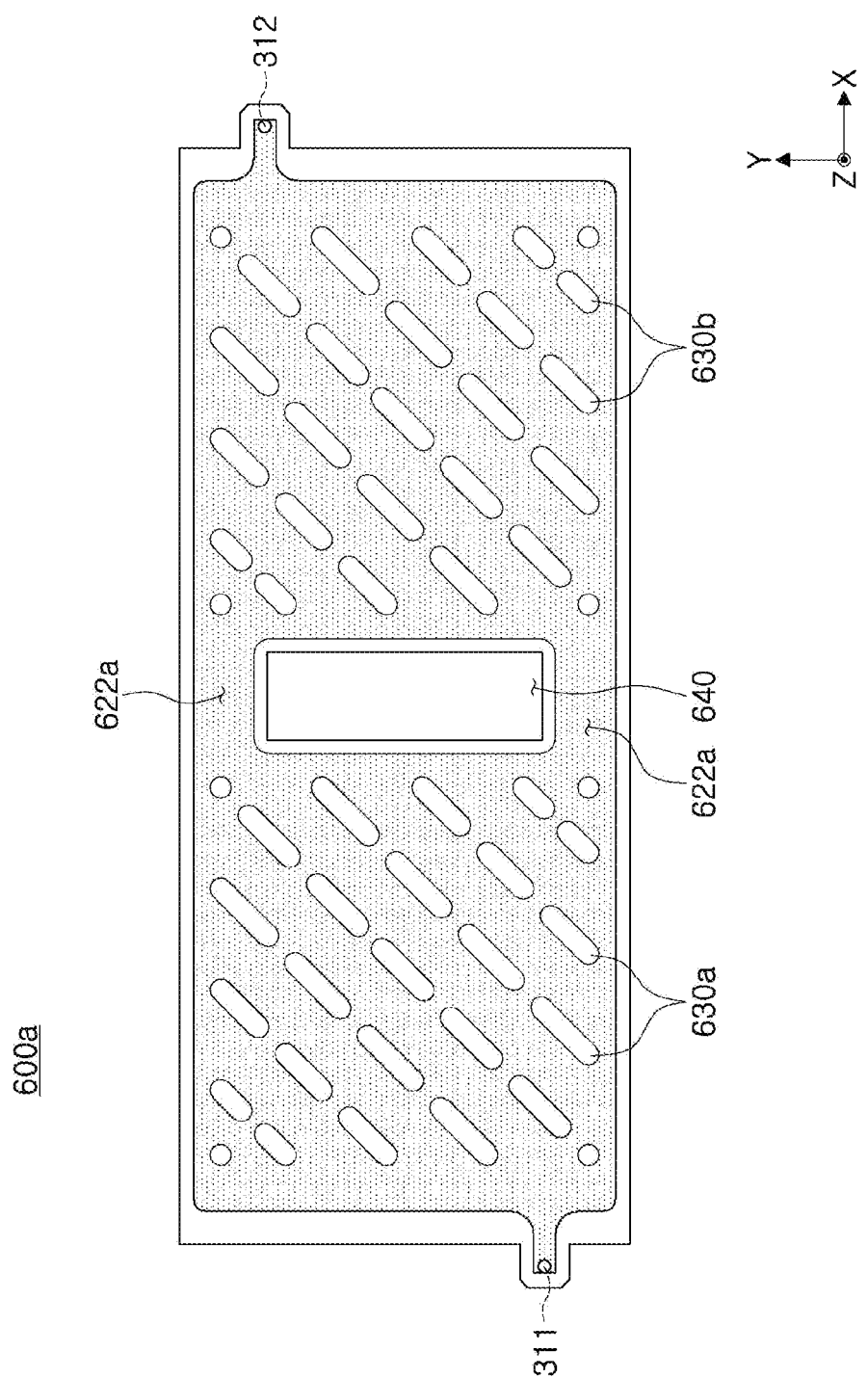
FIG. 7 is a diagram illustrating an example in which a shape of an avoidance portion is partially changed in the cooling plate in FIG. 5.

Also, as illustrated in FIG. 7, only one avoidance portion 640 may be formed. In this case, connection flow paths 622a may be formed along both ends of the avoidance portion 640 in the second direction (Y-axis direction), respectively. In the cooling plate in FIG. 7, the configurations other than the shape of the avoidance portion 640 and the connection flow paths 622a may correspond to those of the cooling plate 600 in FIG. 5.

Hereinafter, various shapes of the guide according to other embodiments will be described.

FIGS. 8 to 11 are diagrams illustrating a cooling plate according to another example embodiment, viewed from above. In the cooling plate described with reference to FIGS. 8 to 11, the configurations other than the shape of the guide may correspond to those of the cooling plate described with reference to FIGS. 1 to 6, and accordingly, overlapping descriptions may not be provided.

Figure 8:
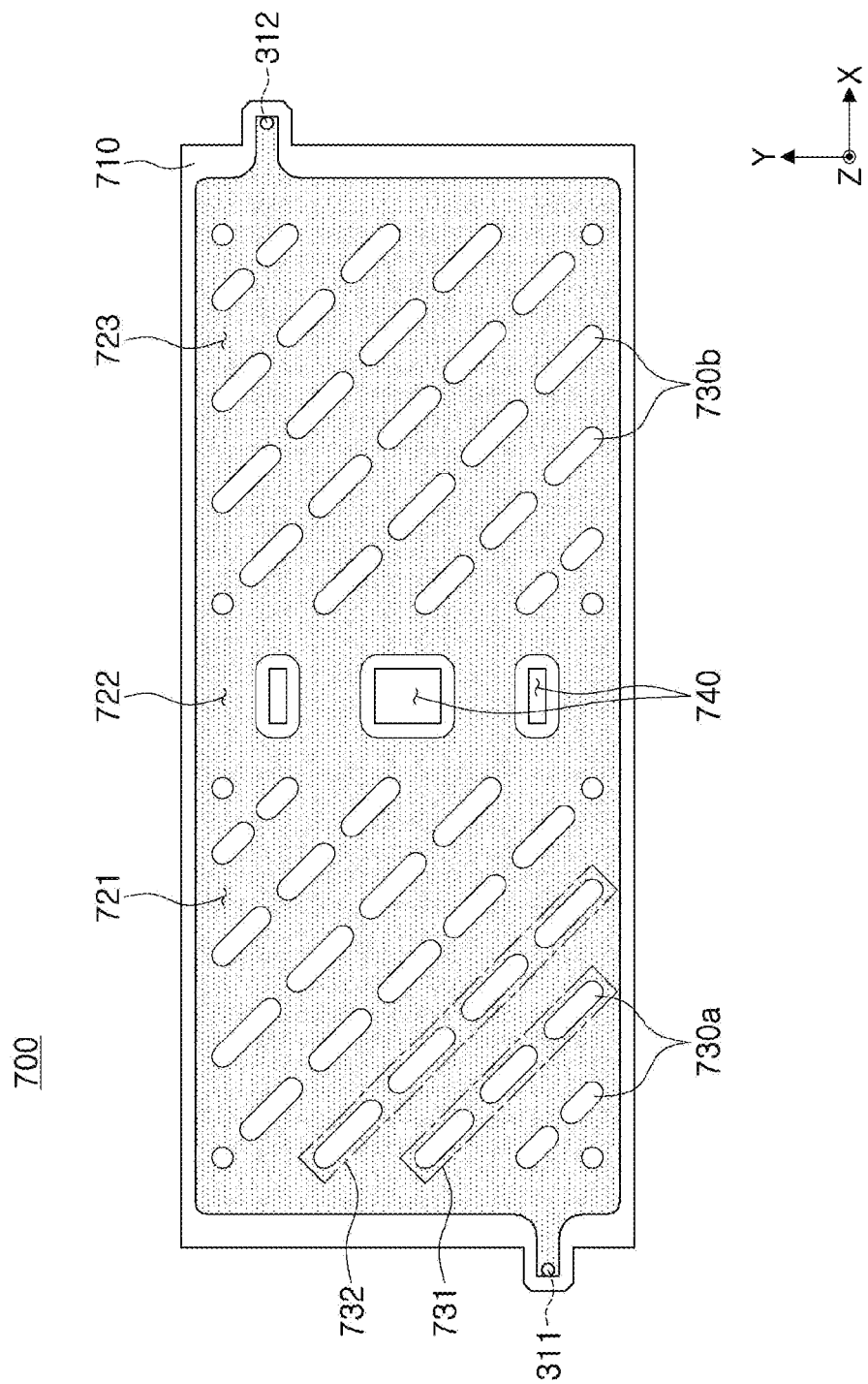
FIG. 8 is a diagram illustrating a cooling plate according to another example embodiment of the present disclosure, viewed from above.

Referring to FIG. 8, guides 730a and 730b of a cooling plate 700 may include a plurality of guide protrusion groups 731 and 732 forming a pattern in a direction different from the fourth direction described with reference to FIG. 6. For example, the guides 730a and 730b may include a plurality of guide protrusion groups 731 and 732 formed by a plurality of guide protrusions arranged in a fifth direction perpendicular to the fourth direction.

By this arrangement, the refrigerant flowing in through the first port 311 may diffuse widely into the first flow path 721 by the guide 730a having a pattern in the fifth direction. Accordingly, the entire first region may be rapidly cooled, which may be advantageous.

Figure 9:
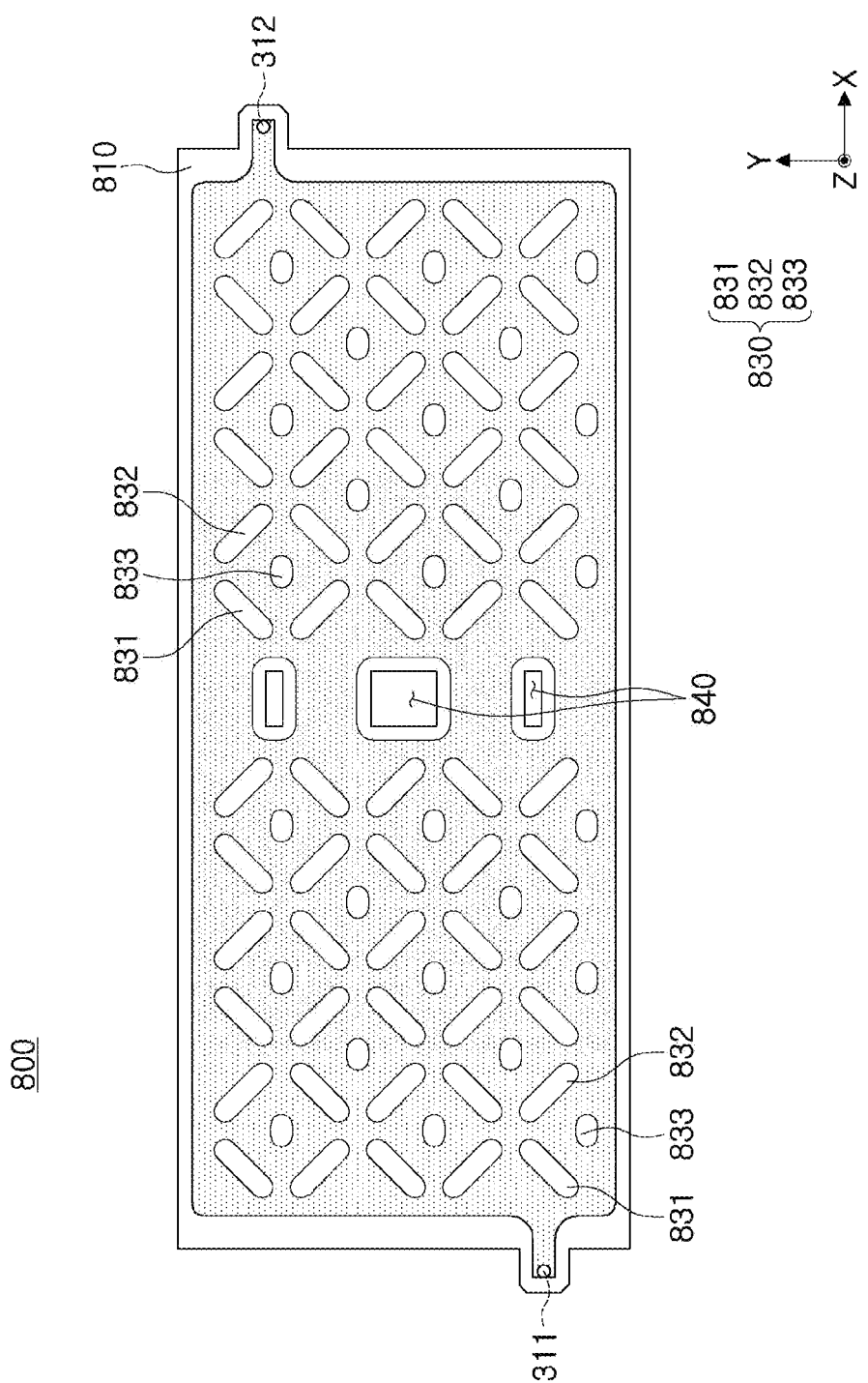
FIG. 9 is a diagram illustrating a cooling plate according to another example embodiment of the present disclosure, viewed from above.

Referring to FIG. 9, the guide 830 of the cooling plate 800 may have a pattern in which guide protrusions 831, 832, and 833 having different shapes and orientations may be alternately disposed.

For example, the guide 830 may include a first guide protrusion 831 extending in the fourth direction described above with reference to FIG. 6, a second guide protrusion 832 extending in the fifth direction described with reference to FIG. 8, and a third guide protrusion 833 having an approximately elliptical (or oval) shape.

The first guide protrusion 831, the second guide protrusion 832, and the third guide protrusion 833 may be alternately arranged in various manners. For example, as illustrated in FIG. 8, the first guide protrusion 831 and the second guide protrusion 832 may be alternately arranged in the first direction (X-axis direction) and the second direction (Y-axis direction), and a third guide protrusion 833 may be disposed therebetween. In this case, the third guide protrusion 833 may be disposed between two first guide protrusions 831 and between two second guide protrusions 832.

By the pattern structure of the guide as illustrated in FIG. 9, the refrigerant may be induced to stably flow in the first direction (X-axis direction) and the second direction (Y-axis direction), and a decrease of pressure due to friction may be prevented.

Figure 10:
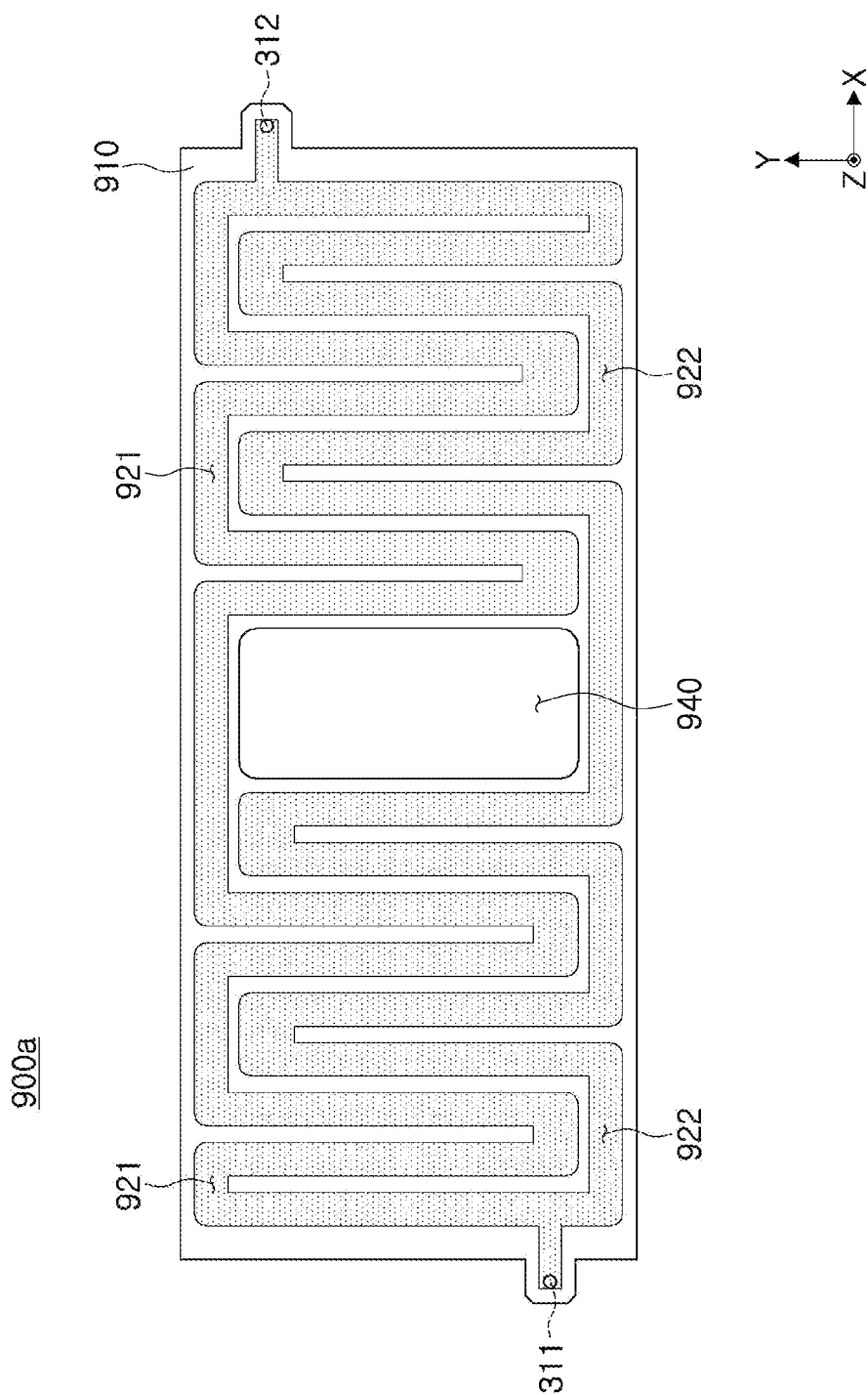
FIG. 10 is a diagram illustrating a cooling plate according to another example embodiment of the present disclosure, viewed from above.
Figure 11:
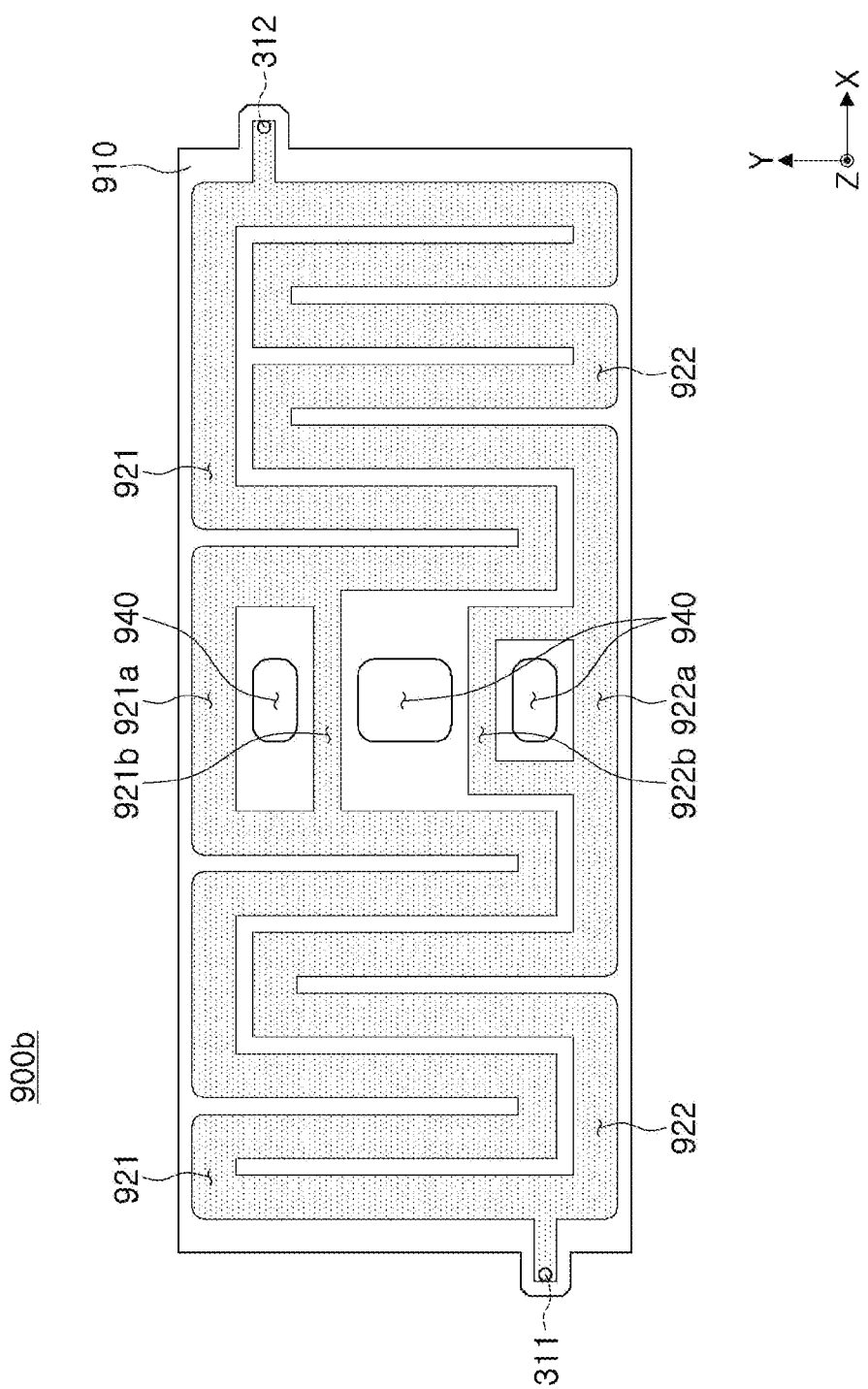
FIG. 11 is a diagram illustrating a cooling plate according to another example embodiment of the present disclosure, viewed from above.

Referring to FIGS. 10 and 11, the guides of the cooling plates 900a and 900b may be formed in a continuous wall shape to form flow paths 921 and 922 having a tubular shape. For example, the guide may be configured such that the refrigerant flowing in through the first port 311 may flow along the first flow path 921 and the second flow path 922 separated from each other and may be discharged through the second port 312.

The first flow path 921 may form a first path through which the refrigerant may flow. Also, the second flow path 922 may be partitioned from the first flow path and may form a second flow path through which the refrigerant may flow. Accordingly, the refrigerant flowing in through the first port 311 may flow along two or more different paths, and may cool the battery module 10, and may be discharged through the second port 312.

Here, the first flow path 921 and the second flow path 922 may have paths bent multiple times, such that the refrigerant may flow evenly throughout regions corresponding to lower portions of the first sub-module and the second sub-module.

A portion of the first flow path 921 and a portion of the second flow path 922 may be spaced apart in the second direction (Y-axis direction) with the avoidance portion 940 of the cooling plates 900a and 900b interposed therebetween.

In this case, when a single avoidance portion 940 is provided as illustrated in FIG. 10, a portion of the first flow path 921 and a portion of the second flow path 922 may be formed along the edge of the cooling frame with the avoidance portion 940 interposed therebetween.

Alternatively, as illustrated in FIG. 11, when a plurality of avoidance portions 940 are provided in the first direction (Y-axis direction), which is the direction in which the connection member (e.g., 200 in FIG. 2) extends, the first flow path 921 may include a first sub-flow path 921a and a second sub-flow path 921b spaced apart from each other with at least the avoidance portion 940 interposed therebetween. The first sub-flow path 921a and the second sub-flow path 921b may pass through the avoidance portion 940, may merge into one path and may form the first flow path 921. Similarly, the second flow path 922 may include a third sub-flow path 922a and a fourth sub-flow path 922b spaced apart from each other with at least one avoidance portion 940 interposed therebetween. The third sub-flow path 922a and the fourth sub-flow path 922b may pass through the avoidance portion 940, may merge and may form the first flow path 922.

A method of manufacturing a battery module may include a sub-module manufacturing step of manufacturing a plurality of sub-modules 100, a connecting step of connecting the manufactured sub-modules 100 to each other via a connection member 200, and a cover step of closing the upper and lower portions of the connected sub-modules by covering the portions with a case (e.g., an upper cover and a lower cover).

A sub-module may be a sub-unit included in at least a portion of a battery module, and a battery module may be manufactured by assembling a plurality of sub-modules. The plurality of sub-modules 100 manufactured as above may be assembled with each other via the connection member 200. The plurality of sub-modules 100 connected to each other by the connection member 200 may be combined with the upper cover 400 and the lower cover 300 covering the upper and lower portions. The plurality of sub-modules 100a and 100b may be seated on the lower cover 300 which may integrally support the components. To increase heat dissipation efficiency, a heat dissipation member 500 may be applied to an upper surface of the lower cover 300. Also, the connection member 200 disposed between the plurality of sub-modules 100a and 100b may be fastened to the lower cover 300 and the upper cover 400. In this case, a bolting coupling method using a separate fastening member 322 may be applied.

The method of manufacturing the battery module 10 may further include a cooling plate coupling step of coupling the cooling plate 600 for cooling the sub-modules 100 to the lower cover 300. In this case, the cooling plate 600 may be coupled to the lower cover 300 by welding, brazing, roll-bonding, thermal fusion, filler bonding, or friction welding. The step of assembling the cooling plate may already be performed before assembling the plurality of sub-modules 100 with the lower cover 300. Alternatively, the coupling of the cooling plate 600 may be performed simultaneously in or after the process of coupling the plurality of sub-modules 100 to the lower cover 300.

The manufacturing method of the battery module 10 is not limited to the above, and for example, the method may further include a step of connecting sensing modules (125 in FIG. 3) for sensing the state of the sub-modules 100 to each other, or a step of connecting a connector to the terminal unit (122 in FIG. 3) of the sub-modules 100.

According to the aforementioned example embodiment, the cooling plate included in the battery module may form a cooling flow path for cooling the entirety of the plurality of sub-modules without interfering with a coupling structure of a connection member for connecting the plurality of sub-modules to each other.

Also, the cooling plate may guide the flow of the refrigerant through a guide having a predetermined pattern, thereby reducing a decrease of pressure generated during the flow process and rapidly cooling a plurality of sub-modules including a large number of battery cells.

While the invention has been described in reference with specific example embodiments illustrated in the accompanying figures, it will be apparent to those skilled in the art that modifications and variations could be made without departing from the scope of the present disclosure as defined by the appended claims.

What is claimed is:

1. A battery module, comprising:
a first sub-module and a second sub-module, each of the first sub-module and the second sub-module including a plurality of battery cells;
a connection member disposed between the first sub-module and the second sub-module;
a lower cover supporting the first sub-module and the second sub-module and connected to the connection member;
a cooling plate coupled to the lower cover and forming a flow path through which a refrigerant can flow; and
an avoidance portion disposed to corresponds to positions in which the connection member and the lower cover are coupled,
wherein the avoidance portion is disposed entirely within an area of the cooling plate between the first sub-module and the second sub-module and in the flow path to divide flow of refrigerant from the first sub-module to the second sub-module;
wherein the avoidance portion includes an opening provided to expose, to an exterior of the battery module, a portion of the lower cover corresponding to a position in which the lower cover and the connection member are coupled; and
wherein the lower cover includes a fastening portion fastened to the connection member, and wherein the avoidance portion exposes the fastening portion through the opening.

2. The battery module of claim 1,
wherein the flow path includes:
a first flow path disposed below the first sub-module;
a second flow path disposed below the second sub-module; and
a third flow path connecting the first flow path to the second flow path, and
wherein at least a portion of the third flow path is disposed to oppose the connection member with the lower cover interposed therebetween.

3. The battery module of claim 1, wherein the cooling plate includes a guide disposed in the flow path and configured to guide a flow of the refrigerant.

4. The battery module of claim 3, wherein the guide includes a plurality of guide protrusions protruding in a direction toward the lower cover to contact with the lower cover.

5. The battery module of claim 4,
wherein the first sub-module and the second sub-module are disposed to oppose each other in a first direction, and
wherein at least one of the plurality of guide protrusions includes:
a flat portion inclined with respect to the first direction; and
curved portions disposed on both ends of the flat portion.

6. The battery module of claim 3,
wherein the first sub-module and the second sub-module are disposed to oppose each other in a first direction, and
wherein the guide includes one or more guide protrusion groups consisting of a plurality of guide protrusions arranged in a second direction different from the first direction.

7. The battery module of claim 6,
wherein the one or more guide protrusion groups include a first guide protrusion group and a second guide protrusion group,
wherein the plurality of guide protrusions included in the first guide protrusion group are spaced apart from each other by a first distance,
wherein one of the plurality of guide protrusions included in the first guide protrusion group is spaced apart from the second guide protrusion group by a second distance, and
wherein the first distance is less than or equal to the second distance.

8. The battery module of claim 1,
wherein the connection member is coupled to a first surface of the lower cover, and
wherein the cooling plate is coupled to a second surface opposite to the first surface of the lower cover.

9. The battery module of claim 8,
wherein the lower cover includes a fastening portion fastened to the connection member, and
wherein the avoidance portion faces the fastening portion to prevent contact between the fastening portion and the refrigerant.

10. The battery module of claim 9, wherein the avoidance portion has an opening shape penetrating through the cooling plate between a first flow path disposed below the first sub-module and a second flow path disposed below the second sub-module.

11. The battery module of claim 9,
wherein the flow path includes:
a first flow path forming a first path through which the refrigerant can flow; and
a second flow path forming a second path partitioned from the first path, and
wherein a portion of the first flow path and a portion of the second flow path are disposed spaced apart from each other with the avoidance portion interposed therebetween.

12. The battery module of claim 11,
wherein a plurality of the avoidance portions are disposed in a length direction of the connection member, and
wherein at least one of the first flow path and the second flow path includes a first sub-flow path and a second sub-flow path spaced apart from each other with at least one of the plurality of avoidance portions interposed therebetween.

13. The battery module of claim 8, wherein a heat dissipation member is disposed on the first surface of the lower cover.

14. A battery module, comprising:
a first sub-module and a second sub-module, each of the first sub-module and the second sub-module including a plurality of battery cells;
a connection member disposed between the first sub-module and the second sub-module;
a lower cover supporting the first sub-module and the second sub-module and coupled to the connection member;
a cooling plate coupled to the lower cover and forming a flow path through which a refrigerant can flow, and
an avoidance portion disposed between the first sub-module and the second sub-module in the flow path and divides flow of refrigerant flows in the flow path,
wherein the avoidance portion includes an opening provided to expose, to an exterior of the battery module, a portion of the lower cover corresponding to a position in which the lower cover and the connection member are coupled; and
wherein the lower cover includes a fastening portion fastened to the connection member, and wherein the avoidance portion exposes the fastening portion through the opening.

15. The battery module of claim 14,
wherein the cooling plate includes a plurality of avoidance portions,
wherein the first sub-module and the second sub-module are disposed to oppose each other in a first direction with the connection member interposed therebetween, and
wherein the plurality of avoidance portions are spaced apart from each other in a second direction perpendicular to the first direction.

16. The battery module of claim 15,
wherein the cooling plate includes a flow path forming a flow path through which a refrigerant can flow, and
wherein at least a portion of the flow path is disposed between the plurality of avoidance portions.

17. The battery module of claim 16, wherein the flow path includes:
a first flow path for cooling the first sub-module;
a second flow path for cooling the second sub-module; and
a third flow path connecting the first flow path to the second flow path, at least a portion of the third flow path is disposed between the plurality of avoidance portions.

18. The battery module of claim 14, further comprising:
a fastening member fastened to the connection member by penetrating through a fastening portion included in the lower cover.

19. A battery module, comprising:
a first sub-module including a first plurality of battery cells;
a second sub-module including a second plurality of battery cells,
a connection member having a first side coupled to the first sub-module and a second side coupled to the second sub-module, the second side being opposite to the first side; and
a cooling plate forming flow path through which a refrigerant can flow, and configured to cool the first sub-module and the second sub-module; and
an avoidance portion disposed in the flow path to correspond to positions in which the connection member and the lower cover are aligned,
wherein the flow path includes:
a first flow path faces the first sub-module for cooling the first sub-module;
a second flow path faces the second sub-module and cooling the second sub-module; and
a third flow path faces the connection member and connecting the first flow path to the second flow path,
wherein the avoidance portion is disposed entirely in the third flow path and divide flow of refrigerant in the third flow path;
wherein the avoidance portion includes an opening provided to expose, to an exterior of the battery module, a portion of the lower cover corresponding to a position in which the lower cover and the connection member are coupled; and wherein the lower cover includes a fastening portion fastened to the connection member, and wherein the avoidance portion exposes the fastening portion through the opening.

\* \* \* \* \*